(12) United States Patent
Ergang et al.

(10) Patent No.: US 9,387,434 B2
(45) Date of Patent: Jul. 12, 2016

(54) MERCURY SORBENTS

(71) Applicant: ECOLAB USA INC., Naperville, IL (US)

(72) Inventors: Nicholas S. Ergang, Naperville, IL (US); Bruce Keiser, Naperville, IL (US); Rebecca Stiles, Naperville, IL (US); Brett Showalter, Naperville, IL (US)

(73) Assignee: Ecolab USA Inc., Naperville, IL (US)

( * ) Notice: Subject to any disclaimer, the term of this patent is extended or adjusted under 35 U.S.C. 154(b) by 93 days.

(21) Appl. No.: 13/971,491

(22) Filed: Aug. 20, 2013

(65) Prior Publication Data

US 2014/0050640 A1  Feb. 20, 2014

Related U.S. Application Data

(60) Provisional application No. 61/691,144, filed on Aug. 20, 2012.

(51) Int. Cl.
| | |
|---|---|
| *B01D 47/00* | (2006.01) |
| *B01D 53/64* | (2006.01) |
| *B01D 53/80* | (2006.01) |
| *B01J 20/10* | (2006.01) |

(52) U.S. Cl.
CPC ............... *B01D 53/64* (2013.01); *B01D 53/80* (2013.01); *B01D 2257/602* (2013.01); *B01J 20/10* (2013.01); *B01J 20/103* (2013.01)

(58) Field of Classification Search
CPC .. B01D 2257/602; B01J 20/10; B01J 20/103; B01J 20/0237; B01J 20/045

USPC ............... 423/210; 502/400, 407, 408
See application file for complete search history.

(56) References Cited

U.S. PATENT DOCUMENTS

| | | | |
|---|---|---|---|
| 4,474,896 | A | 10/1984 | Chao |
| 4,534,944 | A | 8/1985 | Roydhouse |
| 5,110,480 | A * | 5/1992 | Yan ............................. 210/670 |
| 5,164,095 | A | 11/1992 | Sparapany et al. |
| 5,346,627 | A | 9/1994 | Siefert et al. |
| 5,401,392 | A | 3/1995 | Courty et al. |
| 6,503,470 | B1 | 1/2003 | Nolan et al. |
| 6,521,021 | B1 | 2/2003 | Pennline et al. |
| 6,719,828 | B1 | 4/2004 | Lovell et al. |
| 7,048,081 | B2 | 5/2006 | Smith et al. |
| 7,048,781 | B1 | 5/2006 | Lovell |
| 7,550,060 | B2 | 6/2009 | Jacobson et al. |

(Continued)

OTHER PUBLICATIONS

Dong et al., Engineering and characterization of mesoporous silica-coated magnetic particles for mercury removal from industrial effluents, Applied Surface Science 254 (2008) 3522-3530.*

(Continued)

*Primary Examiner* — Matthew E Hoban
*Assistant Examiner* — James Fiorito
(74) *Attorney, Agent, or Firm* — Leydig, Voit & Mayer, Ltd.

(57) ABSTRACT

Disclosed herein are methods for the on-site manufacture of aqueous-based mercury sorbent compositions prepared using a process water. The sorbent compositions may be aqueous-based materials manufactured from a silica containing precursor, a metal species, and a sulfur-based species, in the presence of a process waters, such as a process water from a coal-fired power plant.

18 Claims, 6 Drawing Sheets

(56) References Cited

U.S. PATENT DOCUMENTS

| | | | |
|---|---|---|---|
| 7,572,421 B2 | 8/2009 | Yang et al. | |
| 7,578,869 B2 | 8/2009 | Yang et al. | |
| 7,727,307 B2 | 6/2010 | Winkler | |
| 7,753,982 B2 | 7/2010 | Merritt | |
| 8,025,726 B1 | 9/2011 | Keiser et al. | |
| 2003/0104937 A1* | 6/2003 | Sinha | 502/400 |
| 2005/0211143 A1* | 9/2005 | May et al. | 110/345 |
| 2007/0140941 A1* | 6/2007 | Comrie | 423/215.5 |
| 2009/0148372 A1 | 6/2009 | Keiser et al. | |
| 2010/0320153 A1 | 12/2010 | Cousins et al. | |
| 2010/0331431 A1* | 12/2010 | Keiser et al. | 516/79 |
| 2011/0081286 A1* | 4/2011 | Sasson et al. | 423/215.5 |
| 2011/0123422 A1 | 5/2011 | Wang | |
| 2011/0250110 A1 | 10/2011 | Keiser et al. | |

OTHER PUBLICATIONS

European Patent Office, Extended European Search Report in European Patent Application No. 13830473.8, Feb. 8, 2016, 9 pp.

Korean Intellectual Property Office, International Preliminary Report on Patentability and Written Opinion in International Application No. PCT/US2013/055766, Feb. 24, 2015, 6 pp.

* cited by examiner

MERCURY SORBENTS

CROSS REFERENCE TO RELATED APPLICATIONS

This is a non-provisional claiming priority to U.S. Provisional Application No. 61/691,144, filed on Aug. 20, 2012, the contents of which are fully incorporated herein by reference.

TECHNICAL FIELD

The present disclosure relates generally to mercury sorbents, and more particularly, to an on-site method of manufacturing an aqueous-based mercury sorbent composition.

BACKGROUND

The demand for electricity continues to grow globally. In order to keep stride with the growing demand, coal is being looked to as a source for its generation. The burning of coal in power generation plants results in the release of energy, as well as the production of solid waste such as bottom and fly ash, and flue gas emissions into the environment. The primary gas emissions are criteria pollutants (e.g. sulfur dioxide, nitrogen dioxides, particulate material, and carbon monoxide).

Mercury is typically found in coals at concentrations ranging from 0.02 to 1 ppm. The mercury is present as sulfides, or associated with organic matter. Upon combustion, the mercury is released and emitted into the flue gas as gaseous elemental mercury and other mercury compounds. The mercury appears in the flue gas in both the solid and gas phases (particulate-bound mercury and vapor-phase mercury, respectively). The volatility of mercury and many of its compounds results in a significant portion of the total mercury existing as vapor-phase mercury in the flue gases. Vapor-phase mercury is composed of elemental mercury and oxidized mercury, the relative amounts of these forms being dependent on the amount of chloride in the coal, iron oxide levels in the coal and other constituents in the fly ash, as examples. Speciation, which refers to the form of vapor-phase mercury, is a key parameter in development and design of capture strategies for mercury emissions. Generally, there are two forms of mercury that constitute vapor-phase mercury. The forms are oxidized (e.g., $Hg^{2+}$) and elemental ($Hg^0$) mercury.

Several control strategies have been developed for the control of mercury emissions from coal-fired boilers. Some of these methods include injection of activated carbon, modified activated carbon, various chemical catalysts, and inorganic sorbents. Unfortunately, none of these strategies removes all the mercury from the flue gas. The efficiencies range from as low as 30% to as high as 80% based on the amount of mercury entering the system with the coal. In addition, these technologies either produce unwanted effects on by-products such as impacting the quality of fly ash, or generate additional waste streams for the power plant. Both lead to higher operational costs for the power plant. One promising strategy is to take advantage of existing air pollution control devices or APCDs to augment or to serve as the primary means to remove vapor-phase mercury. Two examples of APCDs are semi-dry and wet scrubbers or Flue Gas Desulfurizer (FGD). Semi-dry FGDs are also known as Spray Dryer Absorbers or SDAs.

Sulfur oxides (SOx) regulatory compliance mandates the use of at least one of several control strategies. Three such strategies that are used in the US are sorbent injection into the combustion gases from a boiler during coal burning and wet or dry Flue Gas Desulfurizers. At present about 3% of the coal-fired power plants are using sorbent injection.

Despite the available technologies, there remains a need for compounds, compositions, methods of preparing the compounds and compositions, and methods of using the compounds and compositions that can cost-effectively and efficiently capture mercury from mercury containing gas streams.

SUMMARY

In one aspect, disclosed is a method of preparing a mercury sorbent composition. The method may include a) providing a concentrated aqueous solution of a silica containing precursor, a concentrated aqueous solution of a metal species, and a concentrated solution of a sulfur-based species; and b) mixing and diluting the solutions in-line with a process water to provide an aqueous-based mercury sorbent composition. The solutions may be mixed in-line with PARETO™ mixing technology. The aqueous-based mercury sorbent composition may be held in a surge tank for storage prior to introduction into a scrubber, or may be directly injected into a scrubber. The scrubber may be a wet, semi-dry, or dry scrubber.

The silica containing precursor may silicic acid, colloidal silica, tetraethylorthosilicate, dispersed fumed silica, or an alkaline silicate. The metal species may be a copper species, such as copper sulfate. The sulfur-based species may be selected from sulfide salts, dithiocarbamates, polymer-based dithiocarbamates, and polysulfide salts.

The aqueous-based mercury sorbent composition may be a slurry comprising a compound of formula (I), $$(SiO_2)_x(OF)_y M_z S_a F \qquad (I),$$

wherein

M is selected from the group consisting of: boron, magnesium, aluminum, calcium, titanium, vanadium, manganese, iron, cobalt, nickel, copper, zinc, zirconium, molybdenum, palladium, silver, cadmium, tin, platinum, gold, and bismuth;

S is a sulfur-based species selected from the group consisting of: sulfide salts, dithiocarbamates, polymer-based dithiocarbamates, and polysulfide salts;

F optionally exists and when present is selected from the group consisting of: a functionalized organosilane, a sulfur-containing organosilane, an amine-containing organosilane, and an alkyl-containing organosilane at a surface area coverage of 0.01-100%; and the molar ratio of y/x is equal to 0.01-0.5, the molar ratio of x/z is equal to 3-300, and the molar ratio of a/z is 1-5.

The aqueous-based mercury sorbent composition may be a slurry comprising a compound of formula (II), $$(SiO_2)_{15} \cdot CuS_5 \qquad (II).$$

The process water may be a process water used in a spray dryer absorber, a circulating dry scrubber, or a wet flue gas desulfurizer. The process water may be for example, flue gas conditioning water for a spray dryer absorber.

The aqueous-based mercury sorbent composition may be a slurry including 1 wt % to about 20 wt % active sorbent component, about 2 wt % to about 17 wt % active sorbent component, or about 3 wt % to about 15 wt % active sorbent component.

The aqueous-based mercury sorbent composition may be applied directly to a water conditioning line of a spray dryer absorber or injected into the quench water of a wet flue gas desulfurizer.

In another aspect, disclosed herein is a method of preparing a mercury sorbent composition, the method comprising: a)

providing a dry sorbent composition; and b) adding a process water to the dry sorbent composition to provide an aqueous-based mercury sorbent composition. The aqueous-based mercury sorbent composition may be prepared using PARETO™ mixing technology. The aqueous-based mercury sorbent composition may be held in a surge tank for storage prior to introduction into a scrubber, or may be directly injected into a scrubber.

The silica containing precursor may silicic acid, colloidal silica, tetraethylorthosilicate, dispersed fumed silica, or an alkaline silicate. The metal species may be a copper species, such as copper sulfate. The sulfur-based species may be selected from sulfide salts, dithiocarbamates, polymer-based dithiocarbamates, and polysulfide salts.

The aqueous-based mercury sorbent composition may be a slurry comprising a compound of formula (I), $$(SiO_2)_x(OH)_yM_zS_aF \qquad (I),$$

wherein

M is selected from the group consisting of: boron, magnesium, aluminum, calcium, titanium, vanadium, manganese, iron, cobalt, nickel, copper, zinc, zirconium, molybdenum, palladium, silver, cadmium, tin, platinum, gold, and bismuth;

S is a sulfur-based species selected from the group consisting of: sulfide salts, dithiocarbamates, polymer-based dithiocarbamates, and polysulfide salts;

F optionally exists and when present is selected from the group consisting of: a functionalized organosilane, a sulfur-containing organosilane, an amine-containing organosilane, and an alkyl-containing organosilane at a surface area coverage of 0.01-100%; and the molar ratio of y/x is equal to 0.01-0.5, the molar ratio of x/z is equal to 3-300, and the molar ratio of a/z is 1-5.

The aqueous-based mercury sorbent composition may be a slurry comprising a compound of formula (II), $$(SiO_2)_{15} \cdot CuS_5 \qquad (II).$$

The process water may be a process water used in a spray dryer absorber, a circulating dry scrubber, or a wet flue gas desulfurizer. The process water may be a flue gas conditioning water for a spray dryer absorber.

The aqueous-based mercury sorbent composition may be a slurry including 1 wt % to about 20 wt % active sorbent component, about 2 wt % to about 17 wt % active sorbent component, or about 3 wt % to about 15 wt % active sorbent component.

The aqueous-based mercury sorbent composition may be applied directly to a flue gas water conditioning line of a spray dryer absorber or injected into the quench water of a wet flue gas desulfurizer.

In another aspect, disclosed herein is a method of capturing mercury from a mercury-containing flue gas, the method comprising: a) preparing an aqueous-based mercury sorbent composition using a process water of a flue gas scrubber process; and b) applying the aqueous-based mercury sorbent composition directly to a flue gas water conditioning line of a spray dryer absorber, a quench water of a wet flue gas desulfurizer, or a feed line of a wet, semi-dry, or dry flue gas scrubber.

The aqueous-based mercury sorbent composition may be a slurry comprising a compound of formula (I), $$(SiO_2)_x(OH)_yM_zS_aF \qquad (I),$$

wherein

M is selected from the group consisting of: boron, magnesium, aluminum, calcium, titanium, vanadium, manganese, iron, cobalt, nickel, copper, zinc, zirconium, molybdenum, palladium, silver, cadmium, tin, platinum, gold, and bismuth;

S is a sulfur-based species selected from the group consisting of: sulfide salts, dithiocarbamates, polymer-based dithiocarbamates, and polysulfide salts;

F optionally exists and when present is selected from the group consisting of: a functionalized organosilane, a sulfur-containing organosilane, an amine-containing organosilane, and an alkyl-containing organosilane at a surface area coverage of 0.01-100%; and the molar ratio of y/x is equal to 0.01-0.5, the molar ratio of x/z is equal to 3-300, and the molar ratio of a/z is 1-5.

The aqueous-based mercury sorbent composition may be a slurry comprising a compound of formula (II), $$(SiO_2)_{15} \cdot CuS_5 \qquad (II).$$

The aqueous-based mercury sorbent composition may be a slurry including 1 wt % to about 20 wt % active sorbent component, about 2 wt % to about 17 wt % active sorbent component, or about 3 wt % to about 15 wt % active sorbent component. The slurry may includes particles of active mercury sorbent, wherein the particles have a diameter about 15 μm to about 250 μm.

The aqueous-based mercury sorbent composition may be provided to a spray dryer absorber at a feed rate.

The aqueous-based mercury sorbent composition may be used in combination with a calcium bromide based oxidant.

The aqueous-based mercury sorbent composition may provide mercury capture at least 3 hours after halting addition of mercury sorbent composition to a flue gas water conditioning line of a spray dryer absorber or a quench water of a wet flue gas desulfurizer.

The aqueous-based mercury sorbent composition may be a dispersion of a dry, inorganic sorbent.

The methods and processes are further described herein.

DETAILED DESCRIPTION

Disclosed herein are non-carbon, non-halogenated mercury sorbent compositions, methods of manufacturing the compositions, and methods of using the compositions. The sorbent composition may be an aqueous-based material (e.g., a slurry) manufactured from a silica containing precursor (e.g., colloidal silica), a metal species (e.g., a copper salt), and a sulfur-based species (e.g., a polysulfide salt) in the presence of a process water (e.g., a process water from a coal-fired power plant). Despite the presence of salts and impurities in the process waters, the aqueous-based material may be manufactured using process waters without adversely affecting the quality or effectiveness of the sorbent. The aqueous-based material may be manufactured at the site of intended use utilizing process water already in place within the system; and may be manufactured in-line using a continuous process via pumps and in-line mixers. Thus, the present invention provides several advantages, including avoiding transportation costs associated with shipping a product primarily comprised of water, reducing storage space requirements for the sorbent as the aqueous-based material may be manufactured in-line, reducing handling concerns associated with dry sorbents, and reducing capital requirements.

The sorbent composition may be introduced into a scrubber process at any suitable location. However, in certain embodiments, the aqueous-based material may be introduced directly into an air pollution control device (APCD) such as a wet, dry, or semi-dry scrubber, examples of which are a spray dryer absorber (SDA), a circulating dry scrubber (CDS), a natural integrated desulfurization system (NIDS), or a wet flue gas desulfurizer (wFGD). The aqueous-based material may be directly injected into a water conditioning line of an SDA or CDS, thereby eliminating the need for duct injection equipment, which in turn is another point to lower capital requirements besides the savings in shipping the dry or concentrated materials. The aqueous-based material may be injected into a flue gas conditioning line without causing any clogging or fouling of plant lines/atomizers.

Furthermore, the inventors have surprisingly and unexpectedly found that direct injection of the aqueous-based material into an APCD provides superior mercury removal from a flue gas relative to dry sorbents, even when the aqueous-based material is introduced at a lower feed rate on an actives basis (e.g., half the amount of active material). This result is unexpected as dry sorbents are typically introduced upstream from an SDA, CDS, or wFGD, and consequently have longer residence time in the scrubber process. Nonetheless, the inventors have found that the aqueous-based materials can be injected downstream at lower feed rates while providing superior mercury sequestration relative to current dry sorbents. It has also been found that the aqueous-based materials can continue to sequester mercury and maintain low mercury emission levels hours after sorbent injection is halted. In certain applications, combination of the aqueous-based mercury sorbent with a mercury oxidant provides a synergistic effect for mercury oxidation and capture from a flue gas.

1. Definition of Terms

Unless otherwise defined, all technical and scientific terms used herein have the same meaning as commonly understood by one of ordinary skill in the art. In case of conflict, the present document, including definitions, will control. Preferred methods and materials are described below, although methods and materials similar or equivalent to those described herein can be used in practice or testing of the present invention. All publications, patent applications, patents and other references mentioned herein are incorporated by reference in their entirety. The materials, methods, and examples disclosed herein are illustrative only and not intended to be limiting.

As used in the specification and the appended claims, the singular forms "a," "and" and "the" include plural references unless the context clearly dictates otherwise. The terms "comprise(s)," "include(s)," "having," "has," "can," "contain(s)," and variants thereof, as used herein, are intended to be open-ended transitional phrases, terms, or words that do not preclude the possibility of additional acts or structures. The present disclosure also contemplates other embodiments "comprising," "consisting of" and "consisting essentially of," the embodiments or elements presented herein, whether explicitly set forth or not.

2. Method of On-Site Manufacture of Mercury Sorbent Compositions

The present invention provides methods for manufacture of mercury sorbent compositions, wherein the compositions may be prepared on-site (e.g., at the site of intended use, such as a coal-fired power plant). A process water (e.g., a water used in a coal-fired power plant) may be used to manufacture the mercury sorbent compositions on-site. The mercury sorbent compositions may be prepared in a continuous manner and fed directly into a scrubber process to remove mercury from a gas stream. The methods provide several advantages, including avoiding transportation costs associated with shipping a product primarily comprised of water, reducing storage space requirements for the sorbent as the aqueous-based material may be manufactured in-line using process waters already in place, reducing handling concerns associated with dry sorbents, and reducing capital requirements.

Process waters suitable for manufacturing the mercury sorbent compositions include, but are not limited to, recycled conditioning water for an SDA or CDS, cooling tower blow down, leachate, reclaimed water, and lime slurry supply. In certain embodiments, suitable process waters are waters used in a wFGD.

In certain embodiments, the mercury sorbent compositions may be prepared using a small skid outfitted with pumps and in-line mixers. Any suitable reactor or mixing device/chamber may be utilized. In certain embodiments, the mercury sorbent compositions may be prepared using PARETO™ mixing technology. Additionally, Ultra Turax, Model Number UTI-25 (available from IKA® Works, Inc. in Wilmington, N.C.), a mixing device, can be utilized.

In certain embodiments, the mercury sorbent compositions may be prepared using one or more mixing chambers as described in U.S. Pat. No. 7,550,060, which is herein incorporated by reference. The mixing chamber may include a first conduit having one or more inlets and outlets; a second conduit having one or more inlets and outlets, wherein said first conduit secures to said second conduit and traverses said second conduit; a mixing chamber that has one or more inlets and outlets, wherein said second conduit secures to said mixing chamber and wherein said outlets of said first conduit and said outlets of said second conduit are in communication with said mixing chamber; and an adaptor that is in communication with said outlet of said mixing chamber and is secured to said mixing chamber. The mixing chamber can be attached or in communication with a receptacle that holds/processes a mixed product or may be attached or in communication with a scrubber process. In one embodiment, said mixing chamber may be attached or in communication with a process water stream leading to a scrubber. In one embodiment, said mixing chamber may be attached or in communication with a spray dryer absorber, a circulating dry scrubber, or a wet flue gas desulfurizer.

In certain embodiments, a mercury sorbent composition may be prepared by using process water (e.g., conditioning water for a spray dryer absorber) for in-line dilution of concentrated silica (e.g., colloidal silica), copper salt, and polysulfide solutions to the desired concentrations using on-line monitoring; and then mixing the solutions in-line (e.g., with PARETO™ mixing technology) to produce the mercury sorbent composition. The mercury sorbent composition may be held in a surge tank or directly injected into a scrubber (e.g., an SDA or CDS). Deionized water may be used as appropriate, such as to provide concentrated solutions of the actives component precursors (e.g., silica, copper salt, and/or polysulfide).

Figure 1:
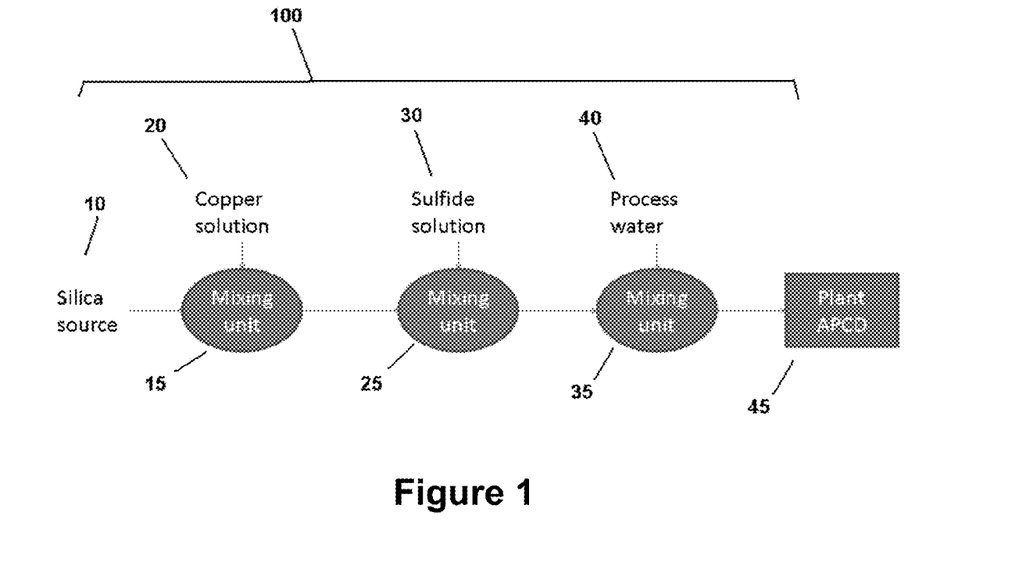
FIG. 1 depicts a process of preparing a mercury sorbent composition.

In certain embodiments, the mercury sorbent compositions may be prepared by a process 100 according to FIG. 1. The process may include a silica source 10, a copper solution 20, a sulfide solution 30, and a process water 40 that are mixed together to provide a mercury sorbent composition. The mercury sorbent composition may be prepared by directing the silica source 10 and the copper solution 20 to a mixing unit 15. The silica source and copper solution may be sufficiently mixed and then directed to a second mixing unit 25 for mixing with the sulfide solution 30. The combined silica source/copper solution/sulfide solution within mixing unit 25 may be sufficiently mixed and then directed to a third mixing unit 35 for mixing with the process water 40. The mercury sorbent composition within mixing unit 35 may then be directed to an air pollution control device (APCD) 45 (e.g., an SDA, CDS, or wFGD), or alternatively to a surge tank. Each of the solutions in the process 100 may be directed to their respective mixing unit, APCD, or surge tank at any suitable feed rate. One or more of the mixing units may be PARETO™ units, such as described in U.S. Pat. No. 7,550,060, which is herein incorporated by reference. One or more of the mixing units may be in-line static mixers, process mixers, or the like. The process may include conduits, pumps, and/or additional mixers. The process may include devices for on-line monitoring of the process steps. The process may be configured as a continuous process for production of mercury sorbent composition. The process may be configured as a continuous process such that the desired amount and feed rate of mercury sorbent composition can be adjusted in real time in response to changes in the overall scrubbing process, such as changes in mercury content in a flue gas.

3. Application of On-Site Manufactured Mercury Sorbent Compositions

The on-site manufactured mercury sorbent compositions may be prepared and used at any plant process that generates mercury. The mercury sorbent compositions may be prepared and used at coal-fired power plants (e.g., bituminous coal-fired, or lignite-fired power stations), natural gas refineries, precious metal mines, waste incineration plants (e.g., domestic waste, hazardous waste, or sewage sludge incineration plants), other plants for high-temperature processes (e.g., cement burning), and high-temperature plants co-fired with waste or combined (multistage) high-temperature plants (e.g., power stations or cement rotary kilns having an upstream waste pyrolysis or waste gasification). The mercury sorbent compositions may be introduced into a gas stream derived from a heat generating system selected from the group consisting of a combustion system, a power plant combustion system, a coal combustion system, a waste incineration system, a kiln, a kiln for mining operations, a recovery boiler, a coal gasification process stream, a gas production stream, a biomass combustion system, and an ore processing system.

The mercury sorbent compositions may be prepared and used in processes of any dimension. The methods can be used in processes having a flue gas volumetric flow rate of $15 \cdot 10^3$ m$^3$ S.T.P. db/h, for example for sewage sludge incineration, or of $50 \cdot 10^3$ m$^3$ S.T.P. db/h, for example in hazardous waste incineration plants, or of $150 \cdot 10^3$ m$^3$ S.T.P. db/h, for example in domestic waste incineration, and also in large power stations having, for example, $2\text{-}3 \cdot 10^6$ m$^3$ S.T.P. db/h.

The mercury sorbent compositions may be added directly to scrubbers currently used in the industry, including spray dryer absorbers, circulating dry scrubbers, and wet flue gas desulfurizers. These types of particulate control devices are provided as examples and are not meant to represent or suggest any limitation.

In general, the mercury sorbent compositions may be introduced into a scrubber via several routes. The mercury sorbent composition may be introduced into a scrubber through a separate port or nozzle, through a port or nozzle adapted for introduction of an aqueous-based limestone slurry, or through a port or nozzle adapted for introduction of a cooling water. In one embodiment, the mercury sorbent composition is applied directly to a water conditioning line of a spray dryer absorber (e.g., the water used to lower the temperature of the flue gas to facilitate SOx capture by lime particles as the gas moves into the SDA). In another embodiment, the mercury sorbent composition is applied directly to a lime slurry supply line of a spray dryer absorber. Introduction routes may be similar for SDA, CDS, and NIDS air pollution control devices, which may be quench water, makeup water, dilution water for lime dispersion, or lime dispersion water. In certain embodiments, the mercury sorbent compositions may be added in a scrubber to the makeup water, quench water, reclaim water, or dilution water for limestone or limestone makeup.

In another preferred embodiment, the mercury sorbent composition may be injected into the quench water of a wet flue gas desulfurizer (wFGD). The quench water is the alkaline slurry used to initially remove the SOx from the flue gas as it flows into the wFGD.

The mercury sorbent composition may be fed into a APCD at any suitable rate. In certain embodiments, the mercury sorbent composition may be fed into an SDA at a rate of about 0.1 to about 5 lb/MMacf on an actives basis. The mercury levels may be lowered to about 0.3 lb/MMAcf.

4. Mercury Sorbent Compositions

The mercury sorbent compositions disclosed herein include non-carbon, non-halogenated mercury sorbent compositions. The mercury sorbent compositions include an actives component and an aqueous component. The actives component may include one or more active sorbent compounds dissolved or dispersed in the aqueous component. The mercury sorbent composition may be a homogeneous mixture or a heterogeneous mixture. For example, the mercury sorbent composition may be an aqueous solution, a colloid, a suspension, or an emulsion. The mercury sorbent composition may be a slurry.

The actives component may be present in the mercury sorbent composition in any suitable amount for the intended application. In certain embodiments, the mercury sorbent composition may comprise about 1 wt % to about 20 wt % active sorbent component, about 2 wt % to about 17 wt % active sorbent component, or about 3 wt % to about 15 wt % active sorbent component. In certain embodiments, the mercury sorbent composition comprises 1 wt % active sorbent component, 2 wt % active sorbent component, 3 wt % active sorbent component, 4 wt % active sorbent component, 5 wt % active sorbent component, 6 wt % active sorbent component, 7 wt % active sorbent component, 8 wt % active sorbent component, 9 wt % active sorbent component, 10 wt % active sorbent component, 11 wt % active sorbent component, 12 wt % active sorbent component, 13 wt % active sorbent component, 14 wt % active sorbent component, 15 wt % active sorbent component, 16 wt % active sorbent component, 17 wt % active sorbent component, 18 wt % active sorbent component, 19 wt % active sorbent component, or 20 wt % active sorbent component.

a. Active Sorbent Component

The mercury sorbent compositions include an active sorbent component that includes at least one active sorbent compound useful for capture of mercury from a mercury containing flue gas. The compounds may serve as both an oxidant and a sorbent to remove elemental mercury from a flue gas stream. The compounds may provide compositions characterized by a particle size of 5 to 200 nm containing aggregated nanoparticles ranging from 3 to 500 nm. The compounds may provide compositions characterized by a surface area of 30 m2/g to 800 m2/g. The compounds may provide compositions characterized by a pore volume of 0.3 cc/g to 2.0 cc/g.

In certain embodiments, the active sorbent compound may have formula (I):

$$(SiO_2)_x(OH)_y M_z S_a F \quad (I)$$

wherein

M is selected from the group consisting of: boron, magnesium, aluminum, calcium, titanium, vanadium, manganese, iron, cobalt, nickel, copper, zinc, zirconium, molybdenum, palladium, silver, cadmium, tin, platinum, gold, and bismuth;

S is a sulfur-based species selected from the group consisting of: sulfide salts, dithiocarbamates, polymer-based dithiocarbamates, and polysulfide salts;

F optionally exists and when present is selected from the group consisting of: a functionalized organosilane, a sulfur-containing organosilane, an amine-containing organosilane, and an alkyl-containing organosilane at a surface area coverage of 0.01-100%; and the molar ratio of y/x is equal to 0.01-0.5, the molar ratio of x/z is equal to 3-300, and the molar ratio of a/z is 1-5.

In certain embodiments, the active sorbent compound may have formula (II):

$$(SiO_2)_{15} \cdot CuS_5 \quad (II).$$

In certain embodiments, the active sorbent compound may be a dry, inorganic sorbent, such as described in U.S. Pat. Nos. 6,719,828 and 7,727,307, which are both herein incorporated by reference.

b. Aqueous Component

The mercury sorbent compositions comprise an aqueous component. In certain embodiments, the aqueous component is derived from deionized water. In certain embodiments, the aqueous component is derived from process waters. Suitable process waters include, but are not limited to, conditioning water for an APCD (e.g., for a spray dryer absorber unit), and lime slurry supply water for an APCD (e.g., for an SDA). In certain embodiments, the aqueous component is derived from a combination of water sources, such as a combination of deionized water and process water.

c. Other Components

The mercury sorbent compositions may include other components. In certain embodiments, the mercury sorbent composition may include 1 to 50% by weight other inorganic sorbents, such as aluminosilicates, silica-containing materials, or synthetic zeolites. In certain embodiments, the mercury sorbent compositions may include 1 to 50% by weight activated carbon. The activated carbon may be produced by the Thief Carbon process as described in U.S. Pat. No. 6,521,021, which is herein incorporated by reference. In certain embodiments, the activated carbon may be prepared from carbon based starting materials, such as coal, lignite, wood, wood byproducts, or bark. In certain embodiments, the activated carbon may be replaced with or mixed with halogenated activated carbon, such as chlorinated activated carbon or brominated activated carbon. In certain embodiments, the mercury sorbent compositions may include 1 to 50% by weight of a silica based mercury sorbent or aluminosilicate based mercury sorbent, such as that described in U.S. Pat. No. 7,572,421, which is herein incorporated by reference.

In certain embodiments, the mercury sorbent compositions may be blended with alkaline sulfur oxide sorbents. Alkaline sulfur oxide sorbents include, but are not limited to, trona, calcium hydroxide, lime, hydrated lime, and calcium oxide containing compounds or materials. In certain embodiments, the alkaline sulfur oxide sorbent may be applied upstream of the sorbent in a scrubber process. In certain embodiments, the sulfur oxide alkaline-containing sorbent may be added separately from the sorbent by such methods as FSI (Furnace Sorbent Injection).

d. Synthetic Methods

In certain embodiments, the mercury sorbent compositions may be prepared by combining in an aqueous medium i) a silica containing precursor, ii) a metal (e.g., a metal salt), and iii) a sulfur-based species. Optionally, iv) an organosilane species may be used to further functionalize the mercury sorbent active compound. In certain embodiments, the mercury sorbent compositions may be prepared according to methods disclosed in U.S. Pat. No. 8,025,726, which is herein incorporated by reference.

In one preferred embodiment, the mercury sorbent composition may be prepared by combining a colloidal silica, a copper salt, and a polysulfide salt in the presence of water, preferably a process water. In certain embodiments, a synthetic approach to the mercury sorbent composition may involve sequential mixing of an alkaline silica solution with an acidic copper solution, followed by the addition of an alkaline polysulfide solution.

i. Silica Containing Precursors

The silica containing precursor may be silicic acid, colloidal silica, tetraethylorthosilicate, dispersed fumed silica, or alkaline silicates (e.g., sodium or potassium silicate). In one preferred embodiment, the silica containing precursor is silicic acid. In another preferred embodiment, the silica containing precursor is Nalco N8691 silica sol, which can be obtained from Nalco Company, 1601 West Diehl Road, Naperville, Ill. 60563.

ii. Metal Species

The metal species may be any suitable species to prepare the actives component. In certain embodiments, the metal species may be a copper species (e.g., copper nitrate, copper sulfate, copper chloride, or the like).

iii. Sulfur-Based Species

The sulfur-based species may be selected from sulfide salts, dithiocarbamates, polymer-based dithiocarbamates, and polysulfide salts. Sulfide salts include, but are not limited to, sodium sulfide, potassium sulfide, and/or metal sulfides such as copper sulfide. Dithiocarbamates include, but are not limited to, dimethyldithiocarbamate (DMDTC) or diethyldithiocarbamate (DEDTC). Polymer-based dithiocarbamates contain organic polymers containing the functional group $R_n CS_2$ wherein R is an alkyl group which is linear or branched. An example of a commercially available polymer-based dithiocarbamate is described in U.S. Pat. Nos. 5,164,095 and 5,346,627, which are herein incorporated by reference. Polysulfides that can be used include, but are not limited to, sodium polysulfide and calcium polysulfide.

iv. Organosilanes

Organosilanes that can be used are well known in the art and may be represented generally by $R_{(4-a)}$—$SiX_a$, wherein a may be from 1 to 3. The organo-functional group, R—, may be any aliphatic or alkene containing functionalized group such as propyl, butyl, 3-chloropropyl, amine, thiol, and combinations thereof. X is representative of a hydrolysable alkoxy group, typically methoxy or ethoxy. Some examples are 3-thiopropyl and mercaptopropyl silanes.

Thiols and amines are represented generally by the class of organic and inorganic compounds containing the amine or thiol group having the general formula —B—(SH) or —B—($NH_2$), wherein B is a linear or branched group consisting of carbon atoms such as —$(CH_2)_n$—, wherein n is from 1 to 15, 1 to 6, or where n is 3.

v. Salts

During the preparation of the mercury sorbent compositions and/or the actives component, salt may be added to increase the conductivity of the reaction solution to 4 mS. Examples of the salts that can be used include, but are not limited to, alkali and alkaline halides, sulfates, phosphates, and nitrates such as sodium sulfite, potassium chloride, sodium chloride, sodium nitrate, calcium sulfate, and potassium phosphate. One skilled in the art would recognize that the effective amount of salt added to reach the desired conductivity will vary dependent on the salt of choice.

In certain embodiments, the addition of salt may not be necessary, particularly where a process water is used to prepare the mercury sorbent composition. The process water may include one or more salts that increase the conductivity of the mercury sorbent composition.

vi. Synthetic Method I—Acidic Starting Point

One synthetic methodology for preparing the mercury sorbent compositions and/or the actives component involves starting from an acidic starting point. In certain embodiments, the mercury sorbent compositions may be prepared by a process including: a) providing a silica containing precursor (SCP) (e.g., silicic acid, colloidal silica, tetraethylorthosilicate, or dispersed fumed silica) contained in aqueous solution that has a pH less than or equal to a pH of 7, preferably from 3 to 4; b) optionally doping the SCP with one or more metal species, wherein said doping occurs when the solution has a pH less than or equal to a pH of 7; c) adjusting the pH of the solution to greater than 7; and d) adding an effective amount of salt to the solution so that the conductivity of the solution is greater than or equal to 4 mS, wherein said addition occurs prior to, simultaneous with, or after the pH adjustment in step c. In certain embodiments, the addition of salt may not be necessary, particularly where a process water is used to prepare the mercury sorbent composition. The process water may include one or more salts that increase the conductivity of the mercury sorbent composition.

In certain embodiments, the pH of the SCP may be adjusted to greater than 7 by mixing/interacting the molecules of said SCP with an alkaline solution at a shear rate of 6 to 23 m/s based on tip speed. The process may include adjusting the pH of the SCP to greater than 7 by mixing said SCP with an alkaline solution via a mixing chamber. An example of a mixing chamber is described in U.S. Pat. No. 7,550,060, "Method and Arrangement for Feeding Chemicals into a Process Stream", which is herein incorporated by reference. The pH of the SCP may be adjusted to greater than 7 by combining said SCP with an alkaline solution with mixing, yielding a Reynolds Number greater than or equal to 2000, to form the silica based product. The pH of the SCP may be adjusted to greater than 7 by combining said SCP with an alkaline solution under transitional flow conditions, i.e. Reynolds Numbers between 2000 and 4000, to form the silica based product. The pH of the SCP may be adjusted to greater than 7 by combining said SCP with an alkaline solution under turbulent flow conditions, i.e. Reynolds Numbers greater than or equal to 4000, to form the silica based product.

The pH of the SCP may be adjusted to a pH range of 7 to 11 with the use of a chemistry selected from at least one of the following: ammonium hydroxide, ammonium carbonate, mineral bases such as, but not limited to, sodium hydroxide and/or potassium hydroxide, organic bases such as, but not limited to, trimethylammonium hydroxide, alkaline silicates, sulfide salts such as, but not limited to, sodium sulfide, and polysulfide containing salts such as, but not limited to, calcium polysulfide and/or sodium polysulfide.

Optionally, where the aqueous-based mercury sorbent compositions will be prepared on-site (e.g., at a coal-fired power plant), a dry composition of the actives component may be prepared off-site by e) filtering and drying the slurry from step d such that the solid concentration of said dried and filtered product is increased from about 5 wt % to about 99 wt %. The dried product from step e may be f) functionalized, such as by surface treating the dried product with an organosilane via controlled hydrolysis and condensation of the silane to the silica surface. The dried product may be functionalized in an organic solvent, a supercritical solvent, or a solvent-free process.

vii. Synthetic Method II—Alkaline Starting Point

Another synthetic methodology involves starting from an alkaline starting point. In certain embodiments, the mercury sorbent compositions may be prepared by a process including: a) providing a silica containing precursor (SCP) (e.g., alkaline silicates) contained in solution that has a pH greater than 7; b) adjusting the pH of the solution to less than or equal to 7; c) optionally doping the SCP with one or more metal species, wherein said doping occurs when the solution has a pH less than or equal to a pH of 7; d) adjusting the pH of the solution to greater than 7; and e) adding an effective amount of salt to the solution so that the conductivity of the solution is greater than or equal to 4 mS, wherein said addition occurs prior to, simultaneous with, or after the pH adjustment in step 2d. In certain embodiments, the addition of salt may not be necessary, particularly where a process water is used to prepare the mercury sorbent composition. The process water may include one or mores salts that increase the conductivity of the mercury sorbent composition.

In certain embodiments, the pH of the silicon-containing precursor may be adjusted to a pH of less than or equal to 7 through the use of at least one of the following: carbonic acid, an organic acid(s) such as but not limited to acetic acid, a mineral acid(s) such as but not limited to sulfuric acid and/or hydrochloric acid. The pH may be decreased to a range of from to 2 to 7. In one embodiment, the pH range of the SCP may be adjusted to a range of 3 to 4 with acetic acid.

In certain embodiments, the pH of the SCP may be adjusted to greater than 7 by mixing/interacting the molecules of said SCP with an alkaline solution at a shear rate of 6 to 23 m/s based on tip speed. The proces may include adjusting the pH of the SCP to greater than 7 by mixing said SCP with an alkaline solution via a mixing chamber. An example of a mixing chamber is described in U.S. Pat. No. 7,550,060, "Method and Arrangement for Feeding Chemicals into a Process Stream", which is herein incorporated by reference. The pH of the SCP may be adjusted to greater than 7 by combining said SCP with an alkaline solution with mixing, yielding a Reynolds Number greater than or equal to 2000, to form the silica based product. The pH of the SCP may be adjusted to greater than 7 by combining said SCP with an alkaline solution under transitional flow conditions, i.e. Reynolds Numbers between 2000 and 4000, to form the silica based product. The pH of the SCP may be adjusted to greater than 7 by combining said SCP with an alkaline solution under turbulent flow conditions, i.e. Reynolds Numbers greater than or equal to 4000, to form the silica based product.

The pH of the SCP may be adjusted to a pH range of 7 to 11 with the use of a chemistry selected from at least one of the following: ammonium hydroxide, ammonium carbonate, mineral bases, organic bases, alkaline silicates, sulfide salts, and polysulfide containing salts.

Optionally, where the aqueous-based mercury sorbent compositions will be prepared on-site (e.g., at a coal-fired power plant), a dry composition of the actives component may be prepared off-site by f) filtering and drying the slurry from step e such that the solid concentration of said dried and filtered product is increased from about 5 wt % to about 99 wt %. The dried product from step f may be g) functionalized, such as by surface treating the dried product with an organosilane via controlled hydrolysis and condensation of the silane to the silica surface. The dried product may be functionalized in an organic solvent, a supercritical solvent, or a solvent-free process.

5. Combination of the Mercury Sorbent Composition with Synergistic Components The mercury sorbent compositions may be applied to a scrubber in combination with an oxidizing agent. In certain embodiments, the application of both a mercury sorbent composition as disclosed herein and an oxidizing agent provides a synergistic effect for the capture and removal of mercury from a mercury containing flue gas. In certain embodiments, the oxidizing agent is selected from the group consisting of: a thermolabile molecular halogen, calcium bromide, and halogen-containing compound. Suitable halogen-containing compounds include, but are not limited to, hydrogen bromide, hydrogen chloride, ammonium bromide, ammonium chloride, sodium chloride, sodium bromide, calcium chloride, and any combination thereof. In one preferred embodiment, the oxidizing agent may be a calcium bromide solution, preferably a 25-100 parts per million (ppm) calcium bromide aqueous solution.

In certain embodiments, the oxidizing agent is applied prior to application of the mercury sorbent composition to a flue gas. In certain embodiments, the oxidizing agent is applied upstream of the application point of the mercury sorbent composition. For example, the oxidant may be fed directly onto the coal in a coal-fired power plant, and the mercury sorbent composition may be applied downstream, such as into a spray dryer absorber downstream of the boiler.

6. Examples

The foregoing may be better understood by reference to the following examples, which are presented for purposes of illustration and are not intended to limit the scope of the invention.

a. Test Site Description

GRE's Stanton Generating Station is located in Stanton, N. Dak. The site operates two baseloaded, PRB-fired boilers which power a single turbine. The coal is sourced from the Spring Creek Mine in southeast Montana. Stanton Unit 10 consists of a 60 MW Combustion Engineering tangential-fired boiler retrofitted with 10w-NOx burners. After exiting the air pre-heater, the flue gas passes a triple-wheel slaked lime spray dryer followed by a reverse-gas baghouse with sonic horn cleaning. During typical full load conditions, temperatures at the SDA inlet are between 360-390° F. and the SDA outlet temperature is held nearly constant at 190° F. The conditioning water feed rate for the slaked lime slurry is maintained at roughly 30 gpm. Inlet mercury measurements were made upstream of the spray dryer, prior to the sorbent injection location at the scrubber inlet, and outlet mercury measurements were made downstream of the baghouse. Typical gas flow during testing at full load was roughly 0.250 million acfm.

Figure 2:
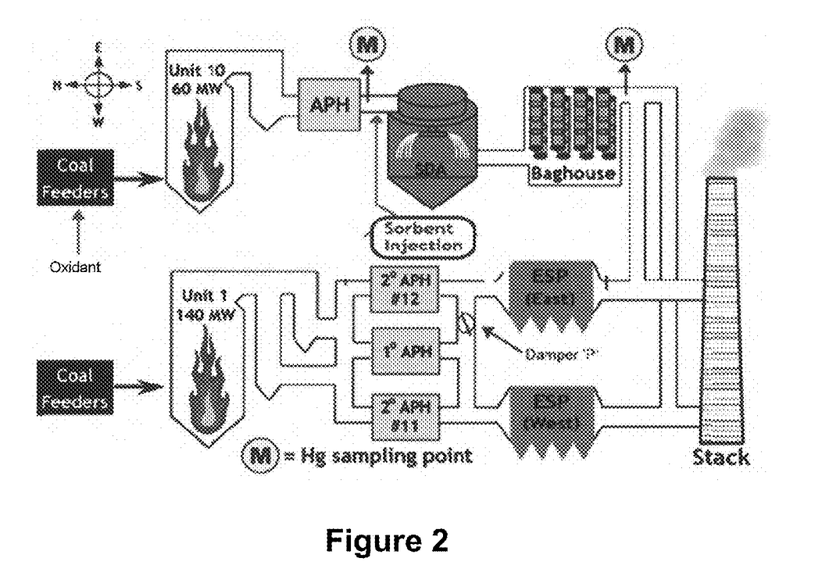
FIG. 2 depicts a schematic of a coal-fired power plant with associated mercury (Hg) sampling points.

Stanton Unit 1 is a 140 MW Foster Wheeler wall-fired boiler with two parallel Research Cottrell cold-side electrostatic precipitators, each with an SCA of 470 $ft^2$/kacfm. Flue gas from the boiler is split between one primary APH and two secondary APHs, and then the gas is split equally between the two ESPs. In previous testing, this arrangement allowed for treatment of just one half of the flue gas across the East ESP. The results discussed were only collected on Unit 10. FIG. 2 is a schematic of a plant layout with the sorbent injection and mercury measuring points.

b. Continuous Mercury Monitoring

Element 1 Engineering, Inc. (E1E) used two continuous mercury monitoring systems (CMMs) to measure mercury amounts and speciation at the inlet of the scrubbers and at the stack, respectively. The E1E CMM is a research-oriented instrument that employs wet chemistry impinger-based sample conditioning equipment. The equipment is designed and constructed to be portable and capable of handling the rigors of field sampling. E1E CMMs are routinely deployed in conditions that would render similar equipment useless; including temperatures ranging from 0° F. to 120° F., as well as exposure to high vibration, abrasive dust, wind, sunlight, and other harsh environmental conditions.

c. Sorbent Feed System

The mercury sorbent slurry composition was fed from 250 gallon totes using a feed pump connected to the intake line of the water conditioning pump for the SDA. The maximum feed rate on the pump was approximately 90 to 100 gph, though the feed rate was typically varied between 15 and 30 gph. The slurry was mixed continuously during feeding.

The dry sorbent injection system utilized during the test program is a portable model designed to feed sorbent materials from 900 lb "super sacks". The unit is built on a standard bulk bag unloading frame equipped with a powered hoist for the loading of sorbent materials. The sorbent material is metered from the bags using a volumetric screw feeder. From the screw feeder, the sorbent material is fed to a solids eductor driven by a blower built into the skid. The solids eductor pulls the metered sorbent material into the conveying line. For this program the portable injection skid sorbent feed was injected into the inlet of the existing permanent sorbent injection system conveying eductor. The injection skid also features a load-cell assembly that provides real-time feedback on the injection rate of sorbent material. For this testing, the sorbents were bucket-fed into the hopper due to the short testing time allotted.

d. Examples

Example 1

Mercury Concentrations as a Function of Slurry Injection at Different Feed Rates Aqueous-based mercury sorbent slurries of $(SiO_2)_{15}.CuS_5$ were manufactured using service water from a coal-fired power plant. Syntheses were performed to provide three slurries with different percent colloidal silica: Sample 1 (7.5 wt % silica), Sample 2 (12 wt % silica), and Sample 3 (15 wt % silica).

Sample 1: 15 wt % silica sol (POSITEK 3G 8699, available from Nalco, 1601 West Diehl Road, Naperville, Ill. 60563) was diluted 1:1 with plant water to obtain 100 g of a 7.5 wt % silica solution. The silica solution (100 g) was mixed with 50 g of a pre-made solution containing 3 g glacial acetic acid and 3.3 g copper (II) sulfate pentahydrate. After mixing, a 150 g solution containing 15 g of 25 wt % ammonia and 9.2 g calcium polysulfide was added to the mixture under high shear. 300 g of plant water was then added to the slurry for dilution purposes.

Sample 2: 15 wt % silica sol (POSITEK 3G 8699, available from Nalco, 1601 West Diehl Road, Naperville, Ill. 60563) was diluted with plant water to obtain 100 g of a 12 wt % silica solution. The silica solution (100 g) was mixed with 50 g of a pre-made solution containing 3 g glacial acetic acid and 3.3 g copper (II) sulfate pentahydrate. After mixing, a 150 g solution containing 15 g of 25 wt % ammonia and 9.2 g calcium polysulfide was added to the mixture under high shear. 300 g of plant water was then added to the slurry for dilution purposes.

Sample 3: 100 g of a 15 wt % silica sol (POSITEK 3G 8699, available from Nalco, 1601 West Diehl Road, Naperville, Ill. 60563) was mixed with 50 g of a pre-made solution containing 3 g glacial acetic acid and 3.3 g copper (II) sulfate pentahydrate. After mixing, a 150 g solution containing 15 g of 25 wt % ammonia and 9.2 g calcium polysulfide was added to the mixture under high shear. 300 g of plant water was then added to the slurry for dilution purposes.

Sample 4: A control was prepared with deionized water. 15 wt % silica sol (POSITEK 3G 8699, available from Nalco, 1601 West Diehl Road•Naperville, Ill. 60563) was diluted with deionized water to obtain 100 g of a 12 wt % silica solution. The silica solution (100 g) was mixed with 50 g of a pre-made solution containing 3 g glacial acetic acid and 3.3 g copper (II) sulfate pentahydrate. After mixing, a 150 g solution containing 15 g of 25 wt % ammonia and 9.2 g calcium polysulfide was added to a homogenizer. 300 g of deionized water was then added to the slurry for dilution purposes.

Figure 3:
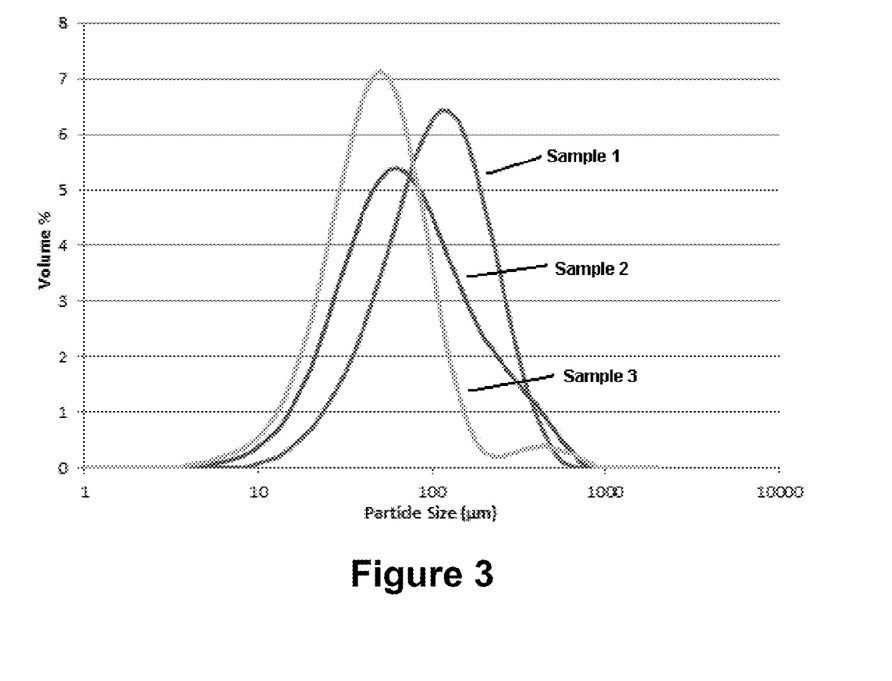
FIG. 3 depicts a comparison of particle size distributions of mercury sorbent composition slurries synthesized using plant service water and using different weight percents of colloidal silica.

The product slurries of Samples 1-3 looked the same as when made with deionized water (Sample 4). The more silica used, the more viscous the solution. To further characterize the product, particle size analyses were performed on the three slurry samples. The results are shown in Table 1 and FIG. 3. It can be seen that manually mixing the samples as opposed to using a homogonizer in leads to larger overall particles. In general, it is concluded that the use of plant service water leads to an acceptable product and thus deionized water is not necessary for manufacturing of the sorbent.

TABLE 1

Comparison of particle size of Sorbent under different synthetic conditions

| Sample name | Water source | Weight % 8699 | Mixing | d(10), μm | d(50), μm | d(90), μm |
|---|---|---|---|---|---|---|
| 1 | Plant service water | 7.5 | Manual | 36 | 101 | 234 |
| 2 | Plant service water | 12 | Manual | 23 | 64 | 224 |
| 3 | Plant service water | 15 | Manual | 18.8 | 46 | 104 |
| 4 | Deionized | 12 | Homogenizer | 12.2 | 33.6 | 78.3 | d(10) = 10% of the particles have diameters below d(10);
d(50) = 50% of the particles have diameters below d(50);
d(90) = 90% of the particles have diameters below d(90)

Example 2

Figure 4:
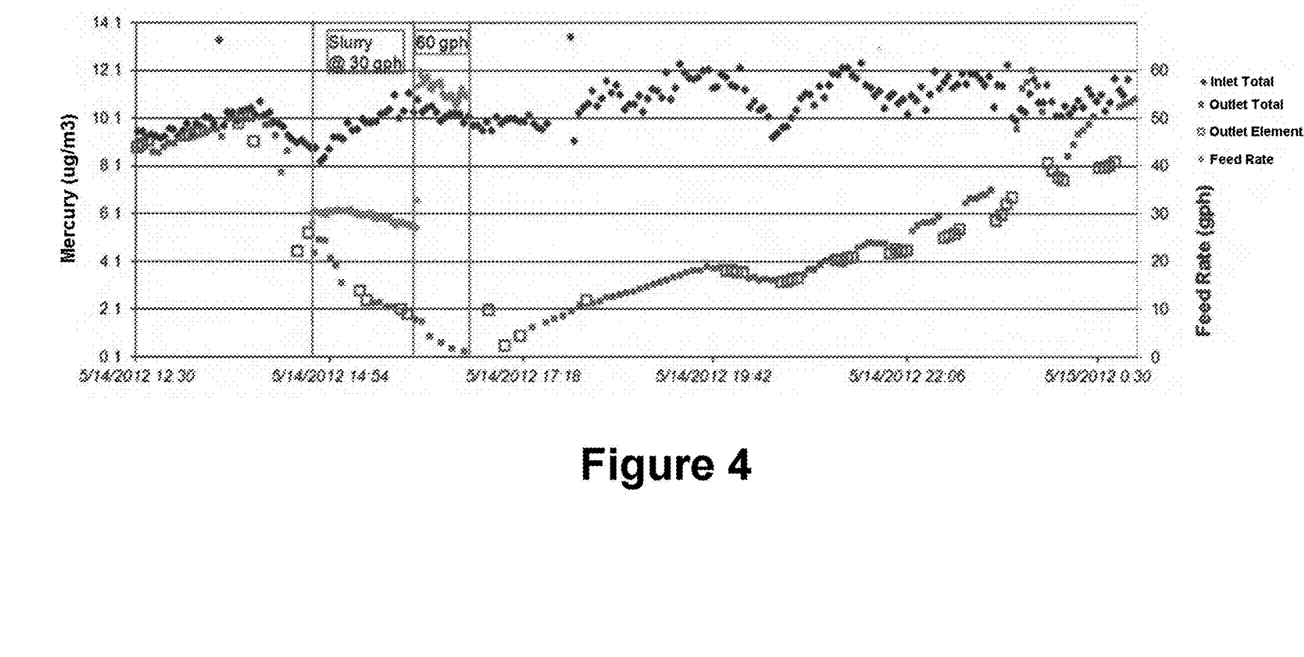
FIG. 4 depicts Hg concentrations as a function of mercury sorbent composition slurry injection feed rate into a spray dryer absorber (SDA) flue gas water conditioning line.

Mercury Concentrations as a Function of Slurry Injection at Different Feed Rates Mercury concentrations were analyzed as a function of aqueous-based material injection feed rate into an SDA water conditioning line. For reference purposes, the typical flow rates of the slurry at 15 to 30 gph correspond on an actives basis to dry sorbent feed rates of 0.3-0.6 lb/MMacf. The initial flow rate was started at 30 gph at which point the outlet mercury dropped from about 8.5 μg/m$^3$ to stabilize around 2.1 ng/m$^3$ (FIG. 4). The flow rate was increased to 60 gph which brought the Hg concentration down to ~0.4 μg/m$^3$ which corresponds to ~0.3 lb Hg/TBtu. After the slurry feed was turned off, the Hg slowly increased back to 4 μg/m$^3$ over 3 hours.

The performance of the liquid sorbent was similar to the dry material tested. Additionally, the removal rate at 30 gph was higher than the dry sorbent at a relative feed rate of ~0.6 lb/MMacf. The Hg slowly moved back toward baseline after the sorbent feed was stopped. The uniform distribution of the active material on the bag surface appears to provide extended removal even without the use of an oxidant, such as calcium bromide oxidant. It appears that the injection through the lime feed and commensurate drying on the lime particle surface in the SDA improves both the sorbent capacity and distribution on the bag surface.

Example 3

Figure 5:
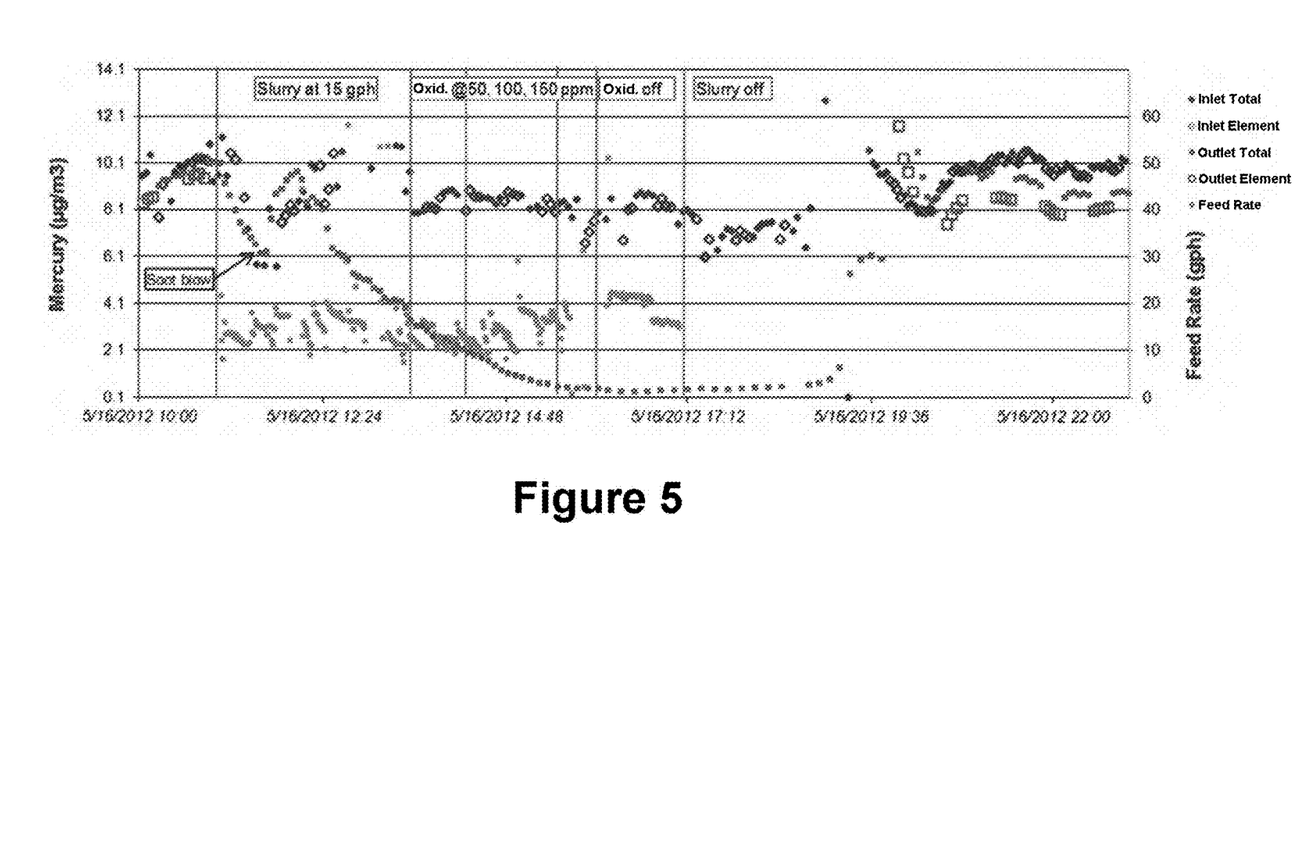
FIG. 5 depicts Hg concentrations as a function of oxidant injection at different feed rates while maintaining the mercury sorbent composition slurry feed rate at about 15 gph. The feed rate shown on the secondary y-axis and in the legend refers to the mercury sorbent composition feed rate.

Mercury Concentrations as a Function of Oxidant Injection at Different Feed Rates with a Constant Slurry Injection Rate In order to more fully understand the synergistic effect of calcium bromide oxidant on the sorbent performance, the sorbent was injected at 15 gph at the lowest available feed rate (~0.3 lb/MMacf). As this was the lowest available feed rate on the injection system, control of the feed rate was difficult and required close monitoring to maintain a level at or around 15 gph. The oxidant did not appear to cause significant oxidation of the inlet mercury. However, the oxidant did have a positive effect on the overall performance of the sorbent (FIG. 5). The slurry was injected at 15 gph, which brought the Hg level down to 4.1 μg/m$^3$ (2.6 lb/TBtu) after the soot blow was completed. Once the oxidant was added to the coal, the Hg dropped again and continually dropped with each subsequent increase in chemical feed to ~0.4 μg/m$^3$ (~0.3 lb/TBtu). The mercury level remained low even after the chemical and slurry feeds were turned off. This level was maintained for a much longer period than the sorbent by itself, which indicated the significant synergistic effect that the oxidant had on the performance of the sorbent. There was continued oxidation of the Hg at the outlet even after the mercury levels returned to baseline due to subsequent bag cleaning, indicating that the sorbent remained active even after losing capacity. The large increase in Hg during sorbent injection was due to a soot blow.

Example 4

Figure 6:
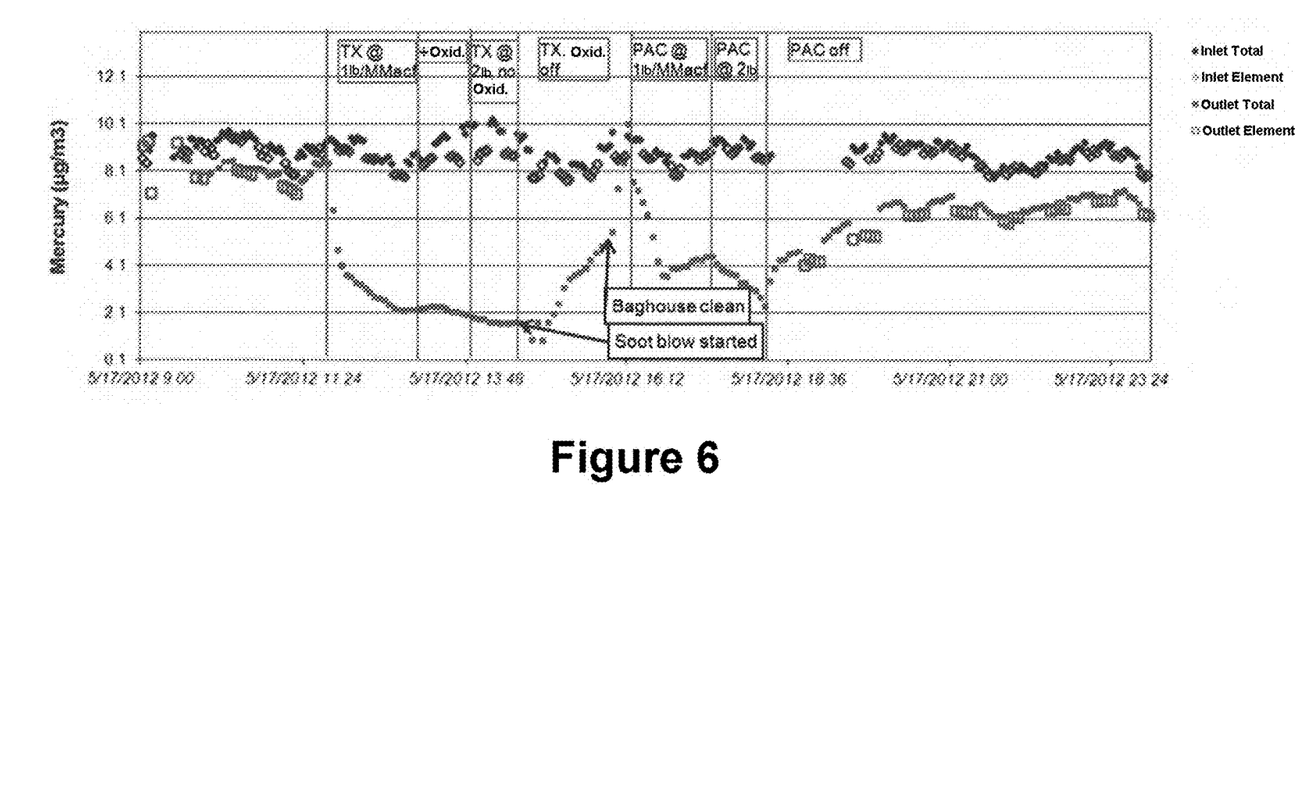
FIG. 6 depicts Hg concentrations as a function of dry sorbent injection at different feed rates. The dry sorbent was fed with oxidant, as well.

Mercury concentrations as a Function of Dry Sorbent Injection at Different Feed Rates For comparison, both a brominated powdered activated carbon (PAC) and a dry version of the slurry, specifically dry $(SiO_2)_{15}.CuS_5$ ("TX") were injected at 1 lb/MMacf and 2 lb/MMacf into the duct prior to the SDA inlet (FIG. 6). A calcium bromide oxidant was also added during the injection of the dry experimental sorbent. In order to run both sorbents in one day, both a baghouse clean and a soot blow were run between injections. The dry sorbent caused a significant drop upon injection and maintained a lower Hg concentration at the outlet than the brominated PAC at similar feed rates. However, these feed rates correspond to slurry sorbent injection rates of ~60 gph and ~110 gph respectively, which were not tested due to the superior performance of the sorbent at lower injection rates.

Any ranges given either in absolute terms or in approximate terms are intended to encompass both, and any definitions used herein are intended to be clarifying and not limiting. Notwithstanding that the numerical ranges and parameters setting forth the broad scope of the invention are approximations, the numerical values set forth in the specific examples are reported as precisely as possible. Any numerical value, however, inherently contains certain errors necessarily resulting from the standard deviation found in their respective testing measurements. Moreover, all ranges disclosed herein are to be understood to encompass any and all subranges (including all fractional and whole values) subsumed therein.

Furthermore, the invention encompasses any and all possible combinations of some or all of the various embodiments described herein. Any and all patents, patent applications, scientific papers, and other references cited in this application, as well as any references cited therein, are hereby incorporated by reference in their entirety.

What is claimed is:

1. A method of capturing mercury from a mercury-containing flue gas, the method comprising:
    applying a slurry comprising water, an oxidizing agent and a non-carbon mercury sorbent composition comprising a metal species and a sulfur-based species to a gas stream derived from a heat generating system, wherein the non-carbon mercury sorbent composition comprises a compound of formula (I), $$(SiO_2)_x(OH)_yM_zS_aF \qquad (I),$$

wherein M is selected from the group consisting of: boron, magnesium, aluminum, calcium, titanium, vanadium, manganese, iron, cobalt, nickel, copper, zinc, zirconium, molybdenum, palladium, silver, cadmium, tin, platinum, gold, and bismuth; S is a sulfur-based species selected from the group consisting of: sulfide salts, dithiocarbamates, polymer-based dithiocarbamates, and polysulfide salts; F optionally exists and when present is selected from the group consisting of: a functionalized organosilane, a sulfur-containing organosilane, an amine-containing organosilane, and an alkyl-containing organosilane at a surface area coverage of 0.01-100%; and the molar ratio of y/x is equal to 0.01-0.5, the molar ratio of x/z is equal to 3-300, and the molar ratio of a/z is 1-5.

2. The method of claim 1, wherein the slurry is prepared using an in-line mixing technology.

3. The method of claim 1, wherein the slurry is held in a surge tank for storage prior to being applied.

4. The method of claim 1, wherein the slurry is applied directly to a water conditioning line of a feed line of at least one of a wet, semi-dry and dry flue gas scrubber.

5. The method of claim 1, wherein the slurry is applied to a water conditioning line of a spray dryer absorber.

6. The method of claim 1, wherein the slurry is applied directly to a quench water of a wet flue gas desulfurizer.

7. The method of claim 1, wherein the slurry further comprises from about 1 wt % to about 20 wt % active sorbent component.

8. The method of claim 7, wherein the mercury sorbent composition comprises particles having a diameter of from about 15 μm to about 250 μm.

9. The method of claim 1, wherein the oxidizing agent comprises at least one of calcium bromide, a thermolabile molecular halogen, hydrogen bromide, hydrogen chloride, ammonium bromide, ammonium chloride, sodium bromide, sodium chloride, calcium chloride, and combinations thereof.

10. The method of claim 1, wherein the oxidizing agent is calcium bromide.

11. The method of claim 1, wherein the slurry is a dispersion of a dry, inorganic sorbent.

12. The method of claim 1, wherein the slurry comprises from about 2 wt % to about 17 wt % mercury sorbent composition.

13. The method of claim 1, wherein the slurry comprises from about 3 wt % to about 15 wt % mercury sorbent composition.

14. The method of claim 1, wherein the heat generating system is selected from the group consisting of: a combustion system, a coal-fired power plant, a waste incineration system, a kiln, a recovery boiler, a coal gasification system, a gas production system, a biomass combustion system, and an ore processing system.

15. The method of claim 1, wherein the heat generating system is a coal-fired power plant.

16. The method of claim 1, wherein the heat generating system is a kiln.

17. The method of claim 16, wherein the kiln is a cement rotary kiln.

18. The method of claim 1, wherein the slurry comprising the non-carbon mercury sorbent composition is applied to the gas stream derived from a heat generating system via at least one of a water conditioning line of a spray dryer absorber, a quench water of a wet flue gas desulfurizer, and a feed line of a wet, semi-dry or dry flue gas scrubber.